US012680896B2

(12) United States Patent　(10) Patent No.:　US 12,680,896 B2
Ho　(45) Date of Patent:　Jul. 14, 2026

(54) STRAIN SENSING DEVICE AND ELECTRIC ACTUATOR HAVING THE SAME

(71) Applicant: TIMOTION TECHNOLOGY CO., LTD., New Taipei City (TW)

(72) Inventor: Tsu-Shuo Ho, New Taipei City (TW)

(73) Assignee: TIMOTION TECHNOLOGY CO., LTD., New Taipei City (TW)

( * ) Notice: Subject to any disclaimer, the term of this patent is extended or adjusted under 35 U.S.C. 154(b) by 287 days.

(21) Appl. No.: 18/667,297

(22) Filed: May 17, 2024

(65) Prior Publication Data

US 2025/0277713 A1　Sep. 4, 2025

(30) Foreign Application Priority Data

Mar. 1, 2024　(TW) ................................. 113107488

(51) Int. Cl.
G01L 5/00　(2006.01)
G01L 1/22　(2006.01)
(52) U.S. Cl.
CPC .......... G01L 5/0061 (2013.01); G01L 1/2225 (2013.01); G01L 1/2287 (2013.01)
(58) Field of Classification Search
CPC .... G01L 5/0061; G01L 1/2225; G01L 1/2287
USPC .......................................................... 73/168
See application file for complete search history.

(56) References Cited

U.S. PATENT DOCUMENTS

| | | | | |
|---|---|---|---|---|
| 4,596,155 | A * | 6/1986 | Kistler | G01L 1/2231 |
| | | | | 73/781 |
| 5,222,398 | A * | 6/1993 | O'Brien | G01L 1/2281 |
| | | | | 73/862.632 |
| 2006/0219028 | A1* | 10/2006 | Kistler | G01B 7/16 |
| | | | | 73/862.045 |
| 2011/0259110 | A1* | 10/2011 | Smith | G01L 1/2243 |
| | | | | 73/783 |

* cited by examiner

*Primary Examiner* — Peter J Macchiarolo
*Assistant Examiner* — Rodney T Frank
(74) *Attorney, Agent, or Firm* — HDLS IPR SERVICES; Chun-Ming Shih

(57)　ABSTRACT

A strain sensing device includes a load body, a pair of strain gauges, and a cable connector. The load body has a chamber, an opening, and a mounting cover. The chamber is communicated to outside of the load body through the opening. A pair of detection surfaces are arranged on opposite sides of the chamber. The opening and the mounting cover are located on opposite sides of the chamber. The cable connector includes a connector head arranged on the mounting cover, and a cable threading the connector head and electrically connected to the strain gauges. When the load body is affected by an external force, the strain gauges respectively detect a deformation of the detection surfaces. The strain sensing device is therefore using alone as a load cell or in conjunction with an actuator and easily installing, disassembling and connecting an external wire.

14 Claims, 7 Drawing Sheets

STRAIN SENSING DEVICE AND ELECTRIC ACTUATOR HAVING THE SAME

BACKGROUND

Technical Field

The present disclosure relates to electric actuator, particularly to an electric actuator with an externally wired strain sensing device.

Description of Related Art

Electric actuators are widely used in industrial, medical, household beds, massage chairs, fitness equipment, rehabilitation equipment, door openers, window openers, lifting mechanisms and other devices and function to push objects weighting tens of kilograms or even thousands of kilograms to achieve lifting or changing angle. Most of the existing electric actuators use an electric motor coupled with a transmission mechanism and a reduction mechanism to drive the lead screw to rotate, and drives the screw-connected telescopic tube to linearly extend or retract by the lead screw.

However, electric actuators have their own load limits, most electric actuators cannot measure the weight of a load. Especially the weights carried by industrial or agricultural electric actuators are so heavy that may exceed the upper limit of the electric actuators to easily cause deformation and damage of the telescopic rod or other mechanisms. To avoid this situation, strain gauges are currently installed on electric actuators to measure the weight of the load. The signal line of the strain gauge is arranged inside the electric actuator, which causes inconvenience in installing and disassembling the strain gauge. Besides, users cannot replace the strain gauge according to their needs, or use software other than the one specified by the designer to cooperate with the inspection.

In view of the above, the inventor seeks to overcome the aforementioned drawbacks associated with the current technology and aims to provide an effective solution through extensive researches along with utilization of academic principles and knowledge.

SUMMARY

The primary objective of the present disclosure is to provide an externally wired strain sensing device, which is used as a load cell, or used with an electric actuator, easily installed or disassembled, and easily connected to an external wire.

To accomplish the aforementioned objective, the present disclosure provides a strain sensing device having a load body, a pair of strain gauges and a cable connector, the load body defines a chamber and an opening and has a mounting cover, the chamber communicates to outside of the load body through the opening, a pair of detection surfaces is arranged on opposite sides of the chamber, the opening and the mounting cover is located on opposite sides of the chamber, each of the strain gauges is arranged on each of the detection surfaces, the cable connector has a connector head arranged on the mounting cover and a cable threading the connector head and electrically connected to the strain gauges, when the load body is affected by an external force, each of the strain gauges is configured to detect a deformation of each of the detection surfaces.

Another aspect of the present disclosure provides that the load body defines a notch, the notch is formed on part of a periphery of the mounting cover and located on same side of the chamber with the mounting cover.

Another aspect of the present disclosure provides that the notch is arc-shaped or inverted U-shaped.

Another aspect of the present disclosure provides that further has a sealing member, the sealing member seals the opening and wraps the strain gauges.

Another aspect of the present disclosure provides that further has a circuit board, the circuit board is arranged in the chamber and located between the strain gauges, the circuit board is electrically connected to the strain gauges and the cable.

To accomplish the aforementioned objective, the present disclosure further provides an electric actuator having a gear box, a motor, a leadscrew, a telescopic tube, and the strain sensing device as mentioned above, the motor is connected to the gear box, part of the leadscrew is accommodated in the gear box and driven by the motor, the other part of the leadscrew extends outside of the gear box, the telescopic tube is threadedly connected to the leadscrew for transmission, the strain sensing device is configured to be detachably connected to the gear box such that an end of the leadscrew is accommodated in the load body, when the telescopic tube is driven to apply a thrust force such that an acting force of the thrust force transmits to impact the load body, each of the strain gauges is configured to detect a deformation of each of the detection surfaces.

Another aspect of the present disclosure provides that the load body defines a pit and has a stopping ring, the pit is recessed from an end surface of the load body, the stopping ring extends outward from an outer edge of the load body.

Another aspect of the present disclosure provides that the gear box has a cover shell, the cover shell has a step and defines a through hole, the step is formed on a periphery of the through hole, the load body penetrates the through hole, the stopping ring abuts against the step, the end of the leadscrew accommodated in the pit.

Another aspect of the present disclosure provides that further has an end cap, the end cap is sleeved and fixed on the leadscrew, the stopping ring is clamped and fixed between the end cap and the step.

Another aspect of the present disclosure provides that the end cap has a positioning block, the load body has an embedded groove, the positioning block is embedded in the embedded groove.

In the strain sensing device of the present disclosure, the strain gauges and the circuit boards are easily assembled through the opening communicated to the chamber. Through the Wheatstone bridge formed by the strain gauges and the circuit boards is integrated with the mating connector, and the mounting cover is arranged on the side opposite to the opening of the chamber for cable connector installing, the strain sensing device of the present disclosure can lead signal wires to outside through the cable connector for use according to different needs and the strain sensing device can be easily assembled or disassembled. The strain sensing device is therefore can use alone as the load cell or use in conjunction with an actuator such as electric actuator. That is each of the strain gauges can detect the changes in resistance value caused by the slight deformation of each of the detection surfaces when the load body is affected by the external force, the changes in resistance value is converted into the deformation of each of the detection surfaces through the Wheatstone bridge, and then the value of the deformation is transmitted to the external through the cable connector for the user to read or for the controller to receive.

The electric actuator of the present disclosure installs the strain sensing device corresponding to the leadscrew on the gear box or the end of the inner tube, so that when the motor drives the leadscrew to rotate by the transmission mechanism to drive the inner tube to extend from the outer tube, the strain gauges can detect the changes in resistance value caused by the slight deformation of each of the detection surfaces, the changes in resistance value is converted into the deformation of each of the detection surfaces through the Wheatstone bridge to measure the loading weight of the electric actuator, and the user can quickly change the position of the strain sensing device according to different needs.

DETAILED DESCRIPTION

Figure 1:
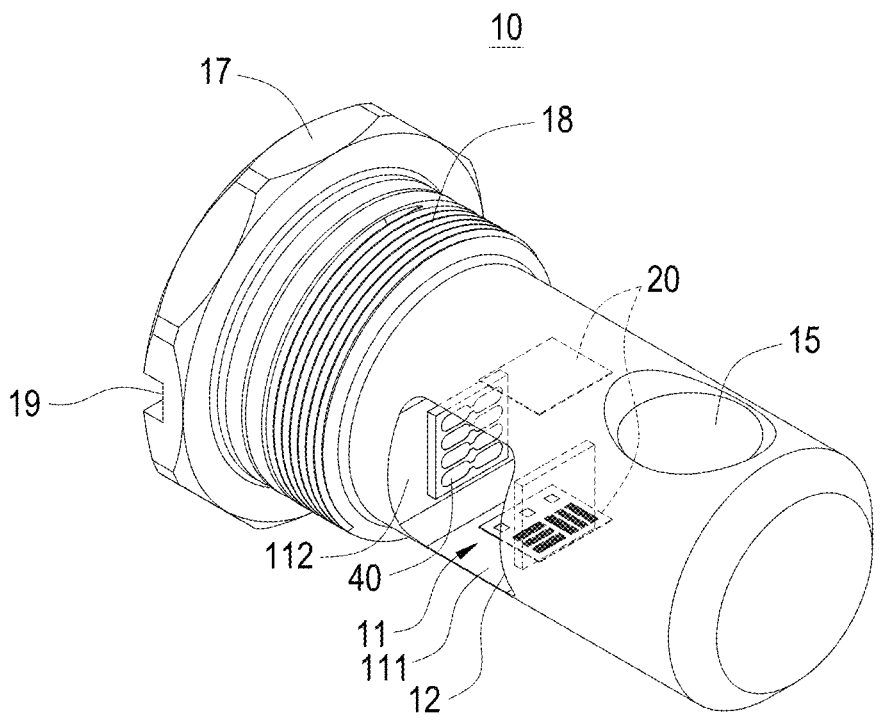
FIG. 1 is a perspective appearance view of the load body of the present disclosure.
Figure 2:
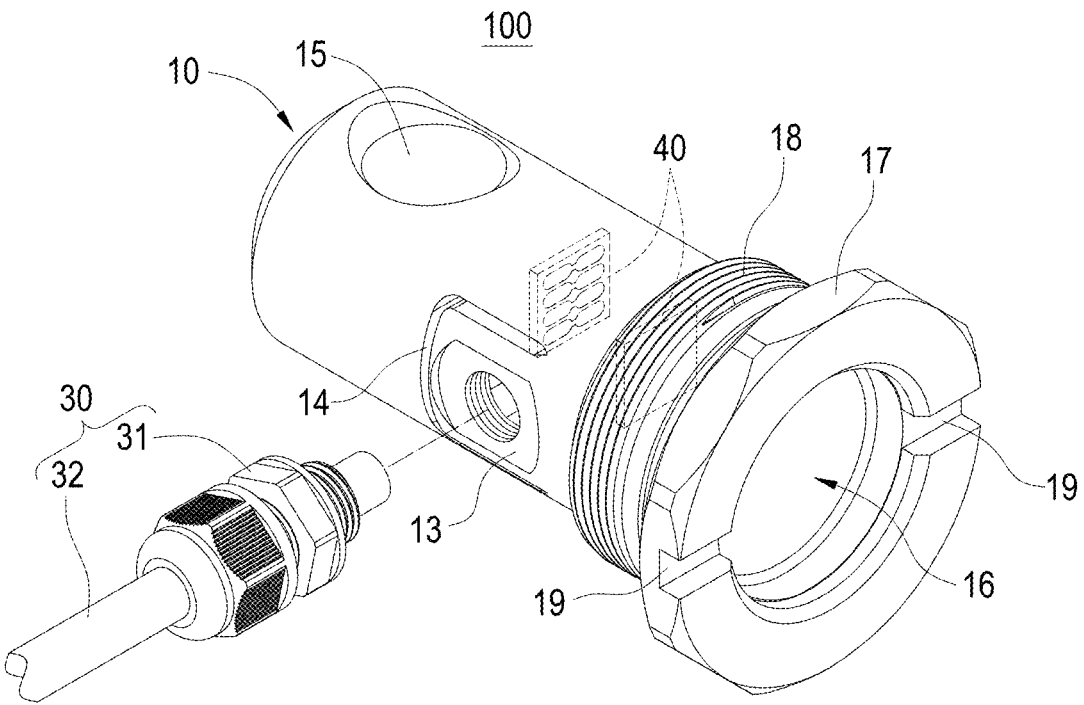
FIG. 2 is an exploded view of the strain sensing device of the present disclosure.

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present disclosure and not used for indicating or implying the specified location of the device or the components or the specified structure and operation in certain location, thus the present disclosure is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer, or the part. Unless being clearly indicated according to the whole specification, the terms for example "the first", "the second", "the third", "the fourth" and "the fifth" are not used for implying the order or sequence.

The technical contents of the present disclosure will become apparent with the detailed description of embodiments and the accompanied drawings as follows. However, it shall be noted that the accompanied drawings are for illustrative purposes only such that they shall not be used to restrict the scope of the present disclosure.

The present disclosure provides a strain sensing device 100. As shown in FIGS. 1, 2, 3, and 4, the strain sensing device 100 of the present disclosure includes a load body 10, a pair of strain gauges 20 and a cable connector 30.

The load body 10 is made of metal alloy such as stainless steel or aluminum alloy to have good mechanical strength, but the present disclosure does not specifically limit what the material of the load body 10. In the embodiment, the load body 10 extends along a longitudinal direction thereof and is generally cylindrical in shape, but the present disclosure is not limited to this specific shape. The shape of the load body 10 can be changed and adjusted according to needs. The load body 10 has a chamber 11, an opening 12, a pair of detection surfaces 111, and a mounting cover 13. The chamber 11 is communicated to an outside space of the load body 10 through the opening 12. In detail, the chamber 11 is a blind hole. In the embodiment, the chamber 11 has four inner surfaces mutually perpendicular to each other. The two opposite inner surfaces (depicted as a top surface and a bottom surface of the chamber 11 in FIG. 1) are respectively the detection surface 111, and the other two opposite inner surfaces are respectively a configuration surface 112. In detail, the detection surfaces 111 are configured to arranged relatively parallel and opposite to each other within the chamber 11. The opening 12 is located on one side of the chamber 11, the mounting cover 13 is located on other side of the chamber 11 opposite to the opening 12.

The strain gauge 20 includes an insulating sheet (not labeled in figures) and a metallic sensitive fence (not labeled in figures). The strain gauge 20 is used to measure a strain of an object deformed by an external force, while the metallic sensitive fence also deforms accordingly to cause corresponding changes in resistance value of the object. Each of the strain gauges 20 is arranged on each of the detection surfaces 111 inside the chamber 11 through the opening 12 to measure a deformation of each of the detection surfaces 111. In detail, the strain sensing device 100 of the present disclosure further includes a pair of circuit boards 40. Each of the circuit boards 40 is arranged on each of the configuration surfaces 112 inside the chamber 11 through the opening 12 and located between the strain gauges 20. That is, each of the strain gauges 20 and each of the circuit boards 40 are arranged perpendicularly and staggered to each other. One of the circuit boards 40 is electrically connected in series with one of the strain gauges 20 to form a first half bridge, and the other circuit board 40 is electrically connected in series with the other strain gauge 20 to form a second half bridge. The first half bridge and the second half bridge are electrically connected in parallel to form a Wheatstone bridge. The Wheatstone bridge can measure the changes in resistance value of the object deformed by the external force to convert to a strain value of the object.

The cable connector 30 includes a connector head 31 and a cable 32. The connector head 31 is detachably arranged on the mounting cover 13. In the embodiment, the connector head 31 is screwed and fixed with an external thread on an internal thread of the mounting cover 13, but the present disclosure is not limited to this. For example, the connector head 31 may also arranged on the mounting cover 13 by fastening, locking, buckling or bonding. The cable 32 is threading the connector head 31 and electrically connected to the strain gauges 20 and the circuit boards 40. In detail, the cable 32 penetrates from one end of the connector head 31 and emerges from the other end of the connector head 31 to be located in the chamber 11 of the load body 10 and to form an electrical connection with the Wheatstone bridge. In the embodiment, although it is not shown in figures, the person having ordinary skill in the art (PHOSITA) can understand that the Wheatstone bridge connecting by the first half bridge and the second half bridge in parallel may electrically connect to a mating connector first, then the cable connector 30 can directly connect to the mating connector to achieve electrical connection when the cable connector 30 installed on the mounting cover 13.

Therefore, when the load body 10 is affected by an external force, each of the strain gauges 20 can detect the changes in resistance value caused by the slight deformation of each of the detection surfaces 111, and then convert the changes in resistance value into the deformation of each of the detection surfaces 111 through the Wheatstone bridge, and then transmit the value of the deformation to an external display (not shown in figures) or a controller (not shown in figures) through the cable connector 30 for an user to read or for the controller to receive. In addition, since the strain gauges 20 and the circuit boards 40 can be arranged inside the chamber 11 through the opening 12 for easy installing, and the Wheatstone bridge formed by the strain gauges 20 and the circuit boards 40 is integrated with the mating connector, the strain sensing device 100 of the present disclosure can lead signal wires to outside through the cable connector 30 for use according to different needs and the strain sensing device 100 can be easily assembled or disassembled. The strain sensing device 100 is therefore can use alone as a load cell or use in conjunction with an actuator such as electric actuator to monitor the strain value.

Details are provided as follows. Please refer FIG. 2. The load body 10 defines a notch 14 communicated to the chamber 11. In detail, the notch 14 is formed on part of a periphery of the mounting cover 13 and located on same side of the chamber 11 with the mounting cover 13. In the embodiment, the notch 14 is inverted U-shaped, but the present disclosure is not limited to this specific shape. For example, the notch 14 may also be arc-shaped, inverted V-shaped or other shapes. It is worth noting that an inverted U-shaped opening of the notch 14 faces to one of longitudinal end of the load body 10 in the embodiment. Thus, since the notch 14 is communicated to the chamber 11 and arranged symmetrically with respect to the opening 12, and the inverted U-shaped opening of the notch 14 faces to one of longitudinal end of the load body 10, the opening 12 and the notch 14 can provide a space allowing the load body 10 to deform when the load body 10 is affected by the external force. The load body 10 is therefore prevented from uneven deformation such that it effectively improves a sensing effect of the strain gauges 20.

Please refer FIGS. 1, 2, 3, and 4. The load body defines a penetrated hole 15. The penetrated hole 15 runs through the load body 10 and is used for the insertion of a fixing equipment, a pin, or a screw mating to the strain sensing device 100. In the embodiment, the strain gauges 20 are respectively arranged along a direction perpendicular to an extended direction that of the penetrated hole 15, but the present disclosure is not limited to this direction. For example, the strain gauges 20 may also be respectively arranged along a direction parallel to an extended direction of the penetrated hole 15.

Figure 3:
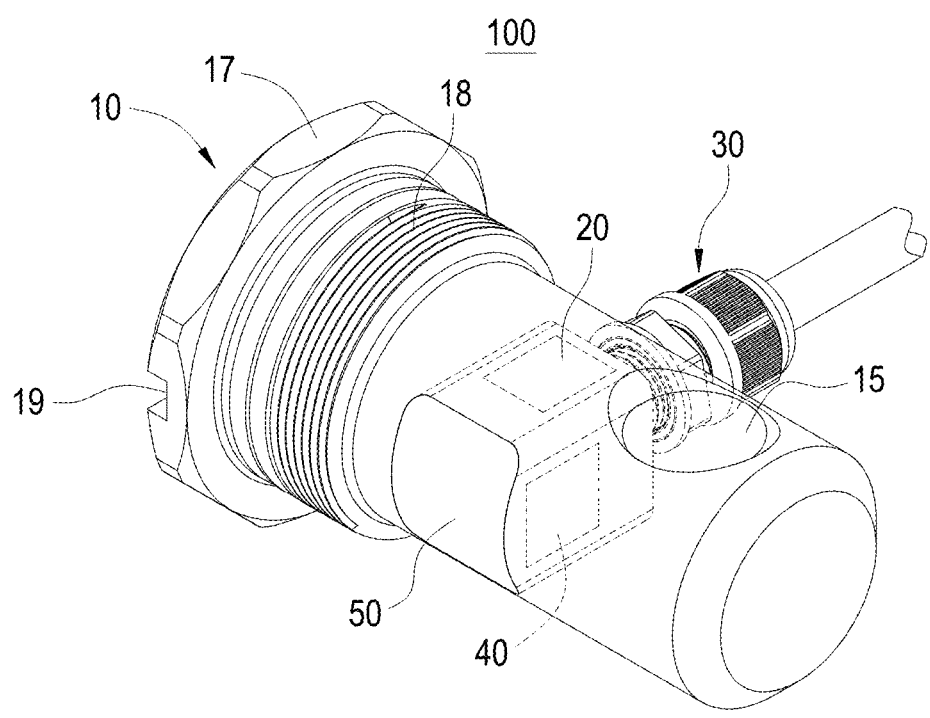
FIG. 3 is a perspective appearance view of the strain sensing device of the present disclosure.
Figure 4:
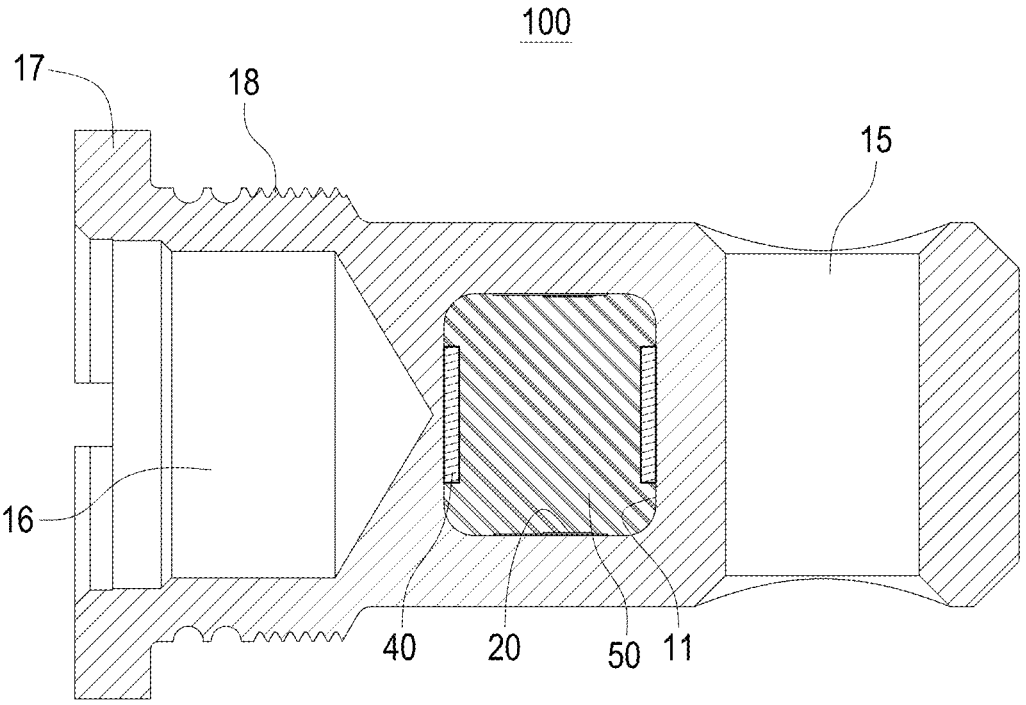
FIG. 4 is a cross-sectional side view of the strain sensing device of the present disclosure.
Figure 5:
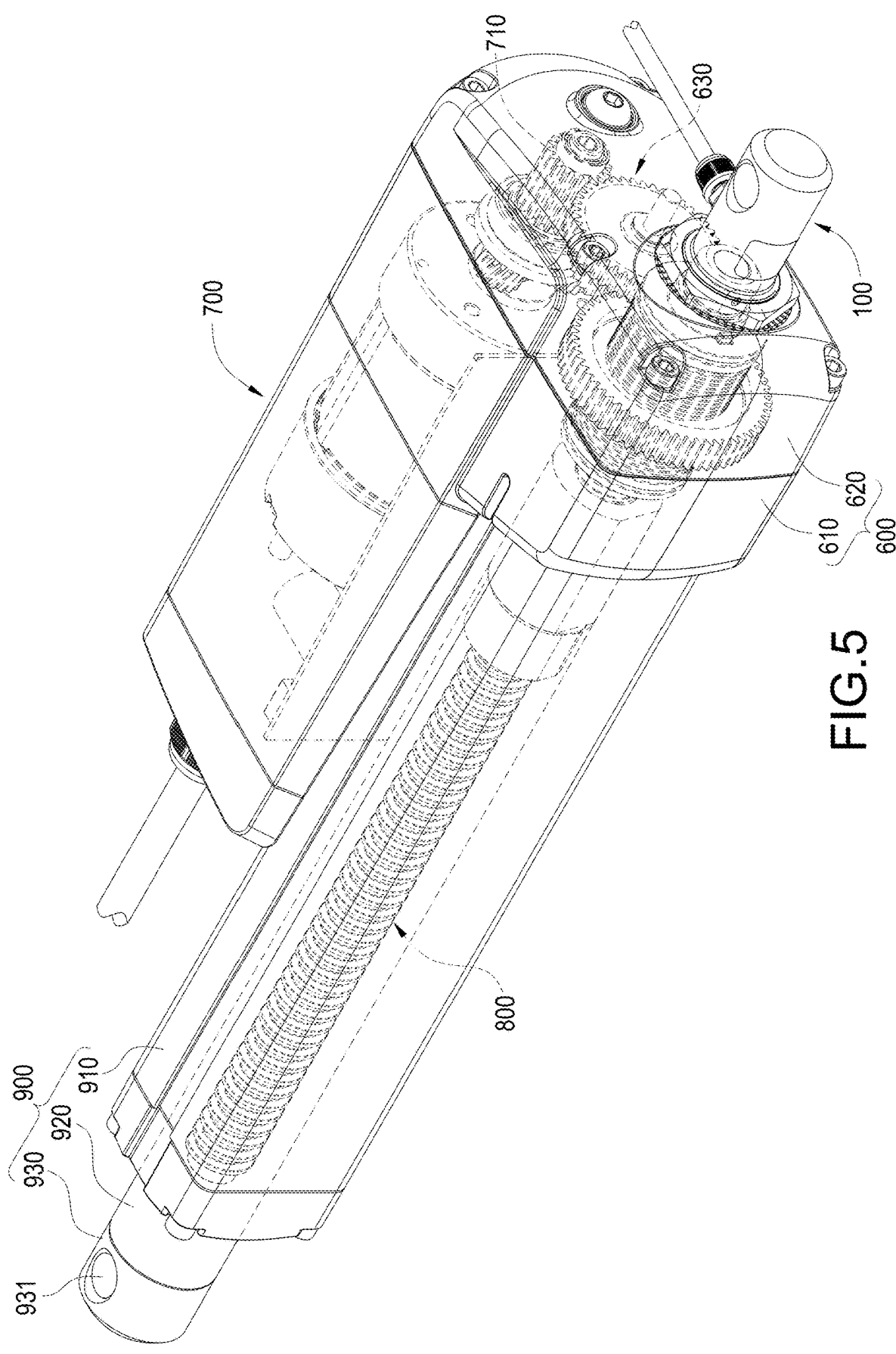
FIG. 5 is a perspective appearance view of the electric actuator in first embodiment of the present disclosure.

Please refer FIG. 3 and FIG. 4. The strain sensing device 100 of the present disclosure further includes a sealing member 50. The sealing member 50 can be an elastomer such as silicone or rubber. In the embodiment, the sealing member 50, for example, is silicone SE9176, but the present disclosure is not limit to this silicone. The sealing member 50 seals the opening 12, and wraps the mating connector and the Wheatstone bridge formed by the strain gauges 20 and the circuit boards 40. In other embodiment, the sealing member 50 may also seal the notch 14 to completely seal the chamber 11 and block the communication of the chamber 11 with the outside space. Therefore, the sealing member 50 can effectively protect each member in the chamber 11, and effectively achieve high air-permeability, insulation, heat resistance, and waterproof inside the strain sensing device 100 at the same time.

The present disclosure further provides an electric actuator. As shown in FIGS. 5, 6, 7, and 8, those figures show the first embodiment of the electric actuator of the present disclosure. The electric actuator of the present disclosure includes a gear box 600, a motor 700, a leadscrew 800, a telescopic tube 900, and the strain sensing device 100 as mentioned above.

The gear box 600 includes a base seat 610, a cover shell 620, and a transmission mechanism 630. The cover shell 620 provides cover and is fixed relative to the base seat 610. The transmission mechanism 630 is accommodated in the base seat 610 and the cover shell 620.

The motor 700 is connected to the gear box 600. In detail, the motor 700 is arranged on a side of the base seat 610 away from the cover shell 620. The motor 700 has a driving shaft 710. The driving draft 710 is power-transmitted connected to the transmission mechanism 630.

A part of the leadscrew 800 is accommodated in the gear box 600 and driven by the motor 700, the other part of the leadscrew 800 extends outside of the gear box 600. In detail, the leadscrew 800 is arranged on the side of the base seat 610 away from the cover shell 620 and parallel adjacent to the motor 700. The leadscrew 800 is power-transmitted connected to the transmission mechanism 630 such that the motor 700 can drive the leadscrew 800 to rotate through the transmission mechanism 630.

The telescopic tube 900 is threadedly connected to the leadscrew 800 for transmission. In detail, the telescopic tube 900 includes an outer tube 910, an inner tube 920, and a supporting seat 930. The inner tube 920 is sleeved on a periphery of the leadscrew 800 and threadedly connected to the leadscrew 800, the outer tube 910 is sleeved along the periphery of the leadscrew 800 for the inner tube 920 threading inside, so that the leadscrew 800 can drive the inner tube 920 to linearly move along an axial direction relative to the outer tube 910 when rotated. The supporting seat 930 is fixed, by screw connection, on an end of the inner tube 920 away from the gear box 600. The supporting seat 930 defines a penetrated hole 931 used for receiving the insertion of a fixing equipment, a pin, or a screw mating to the electric actuator.

The specific members and structures of the strain sensing device 100 are the same as mentioned above, so the description thereof is omitted here for brevity. In the embodiment, the strain sensing device 100 is configured to be detachably connected to the gear box 600 such that an end of the leadscrew 800 is accommodated in the load body 10. In detail, the load body 10 defines a pit 16 and has a stopping ring 17, and the cover shell 620 has a step 621 and defines a through hole 622. Please refer FIG. 2 and FIG. 4, the pit 16 is recessed from an end surface of the load body 10, the stopping ring 17 extends outward from an outer edge of the load body 10 and located on the end surface formed on the load body 10. Please refer FIG. 6 and FIG. 8, the through hole 622 is arranged on the cover shell 620 corresponding to the end of the leadscrew 800, and the step 621 is formed on a periphery of the through hole 622. Please refer FIG. 8, when the electric actuator is completely assembled, the load body 10 penetrates the through hole 622 of the cover shell 620 such that the stopping ring 17 of the load body 10 abuts against the step 621 of the cover shell 620 to accommodate the end of the leadscrew 800 in the pit 16 of the load body 10.

Therefore, when the telescopic tube 900 is driven to apply to a thrust force, that is the motor 700 drives the leadscrew 800 to rotate through the transmission mechanism 630 to drive the inner tube 920 to extend relative to the outer tube 910 such that an acting force of the thrust force transmits to impact the load body 10, each of the strain gauges 20 of the strain sensing device 100 can detect the deformation of each of the detection surfaces 111 to measure a loading weight of the electric actuator.

Figure 6:
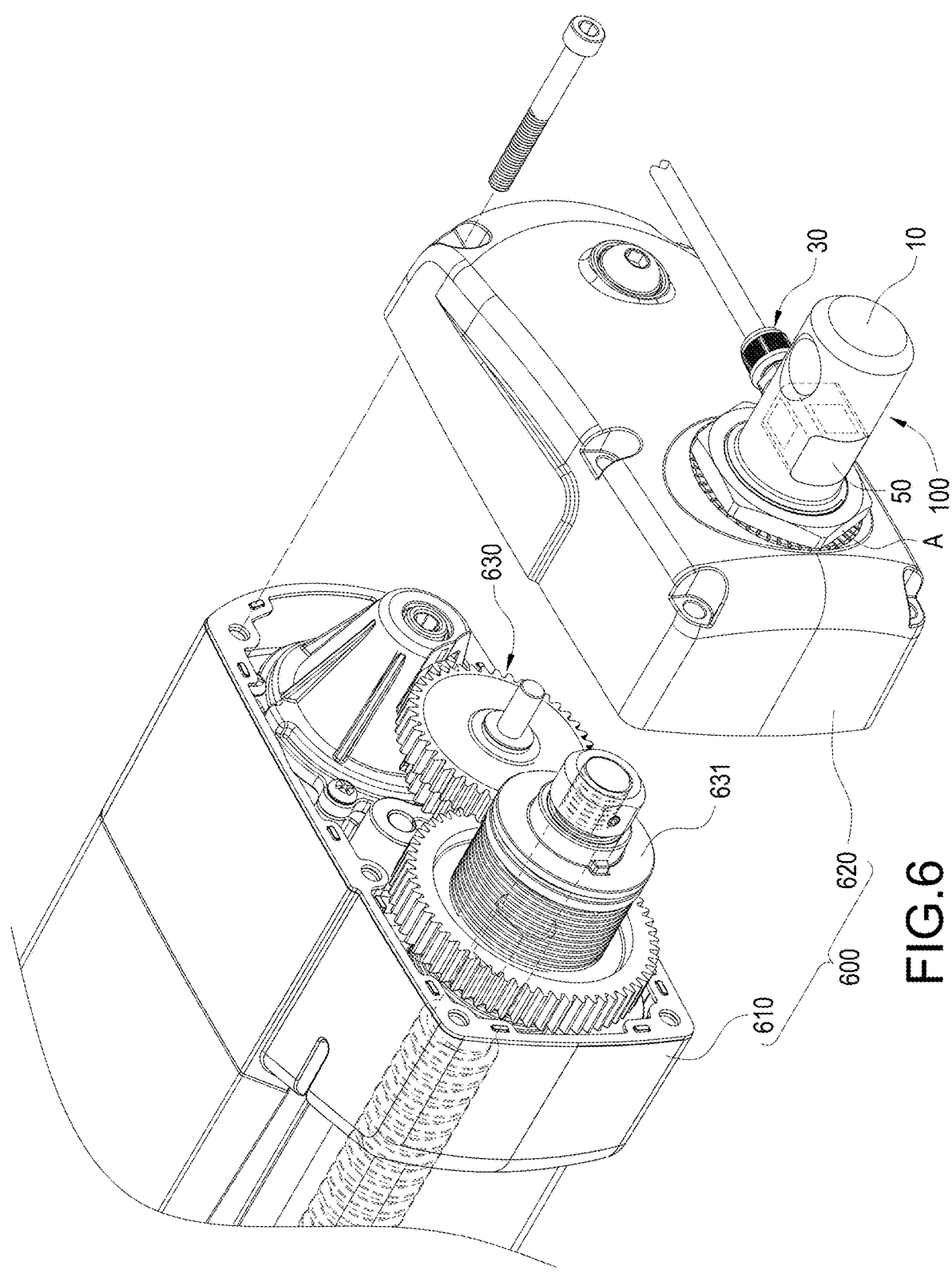
FIG. 6 is a partially exploded view of the electric actuator in first embodiment of the present disclosure.
Figure 7:
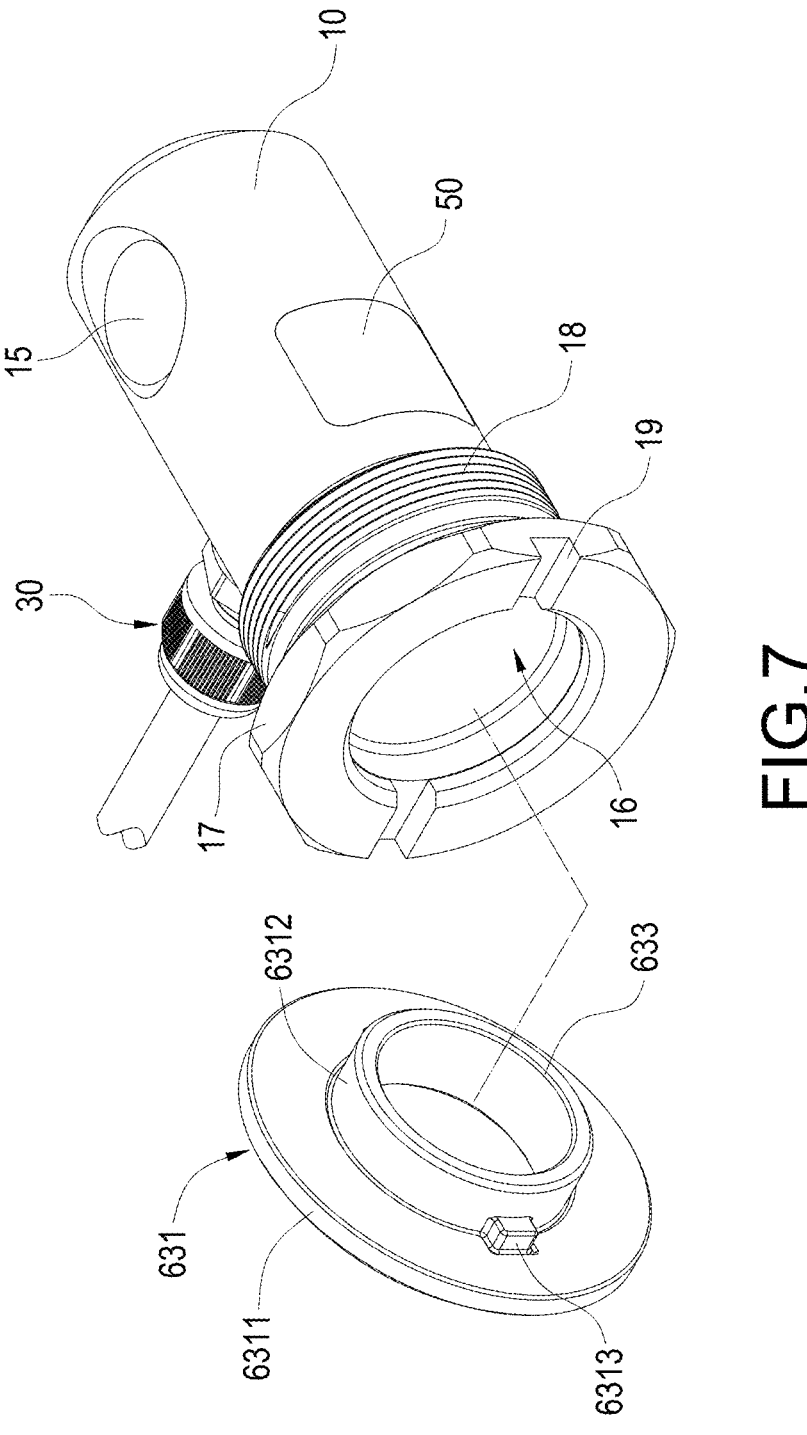
FIG. 7 is an exploded view of the end cap and the load body in first embodiment of the present disclosure.
Figure 8:
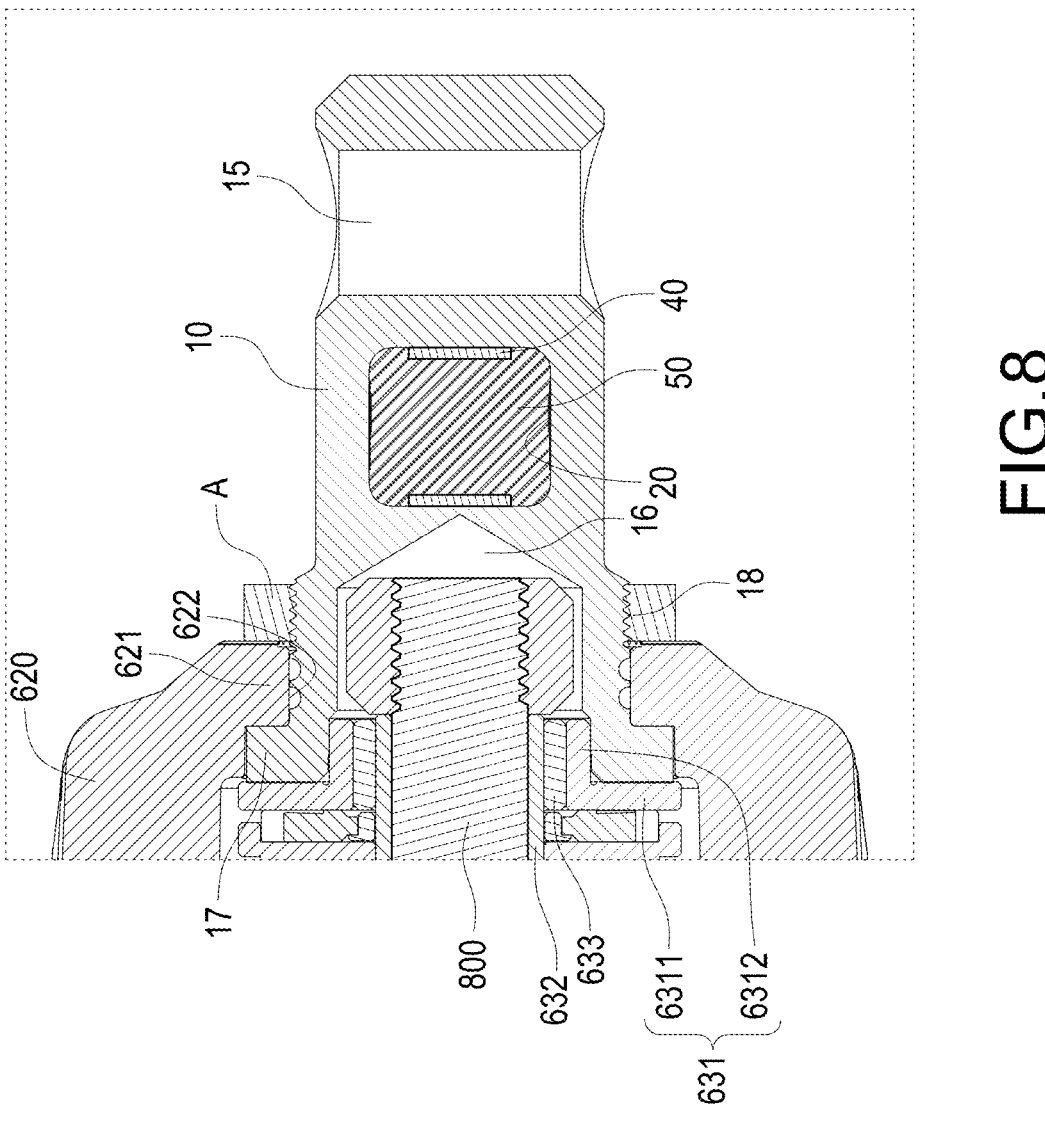
FIG. 8 is a partially cross-sectional view of the electric actuator in first embodiment of the present disclosure.

Please refer FIGS. 6, 7, and 8, a thread portion 18 is formed on part of the outer edge of the load body 10. Thus, through screwing a nut A on the thread portion 18 to press against an outside of the cover shell 620 by an end surface of the nut A, the load body 10 is therefore fixed on the cover shell 620, but the present disclosure is not limit to this fixed way. For example, the load body 10 may also be fixed on the cover shell 620 by fastening, locking, buckling or bonding.

Details are provided as follows. The electric actuator of the present disclosure further includes an end cap 631, a bushing 632, and a bearing 633. The end cap 631 includes a hollow plate 6311 and a hollow convex-ring 6312. The end cap 631 is sleeved and fixed on the leadscrew 800, and the stopping ring 17 is clamped and fixed between the end cap 631 and the step 621. In detail, the bearing 633 is sleeved on the leadscrew 800 and supported between the end cap 631 and the bushing 632, and the hollow plate 6311 and the hollow convex-ring 6312 are jointly sleeved on the bearing 633. Thus, the stopping ring 17 is clamped and fixed between the hollow plate 6311 of the end cap 631 and the step 621 of the cover shell 620 along the longitudinal direction, and clamped and fixed between the hollow convex-ring 6312 of the end cap 631 and the cover shell 620 along a vertical direction (depicted as an up-and-down direction in FIG. 8). Therefore, when the electric actuator is mounted on a load, the acting force exerted to the leadscrew 800 will be transmitted to the load body 10 along the bushing 632, the bearing 633, the end cap 631 and the step 621 sequentially, so that the strain gauges 20 detect the changes in resistance value caused by the deformation of the load body 10, and then the changes in resistance value is converted into the deformation of each of the detection surfaces 111 through the Wheatstone bridge, and the value of the deformation is transmitted to outside of the load body 10 through the cable connector 30.

In addition, please refer FIG. 7, the end cap 631 includes a positioning block 6313, the load body defines an embedded groove 19. The positioning block 6313 is embedded in the embedded groove 19 to avoid the end cap 631 from rotating relative to the load body 10. In detail, the positioning block 6313 extends from a side surface of the hollow plate 6311 facing to the hollow convex-ring 6312, and the embedded groove 19 is formed on the end surface of the load body 10 forming the pit 16. Thus, the load body 10 is positioned on the end cap 631 and unable to rotate when the positioning block 6313 is embedded in the embedded groove 19, so that it is effective to ensure a sensing accuracy and stability of the strain sensing device 100. In the embodiment, a number of the positioning block 6313 is two, but the present disclosure is not limited thereto. For example, the number of positioning block 6313 may also be one or more than three.

Figure 9:
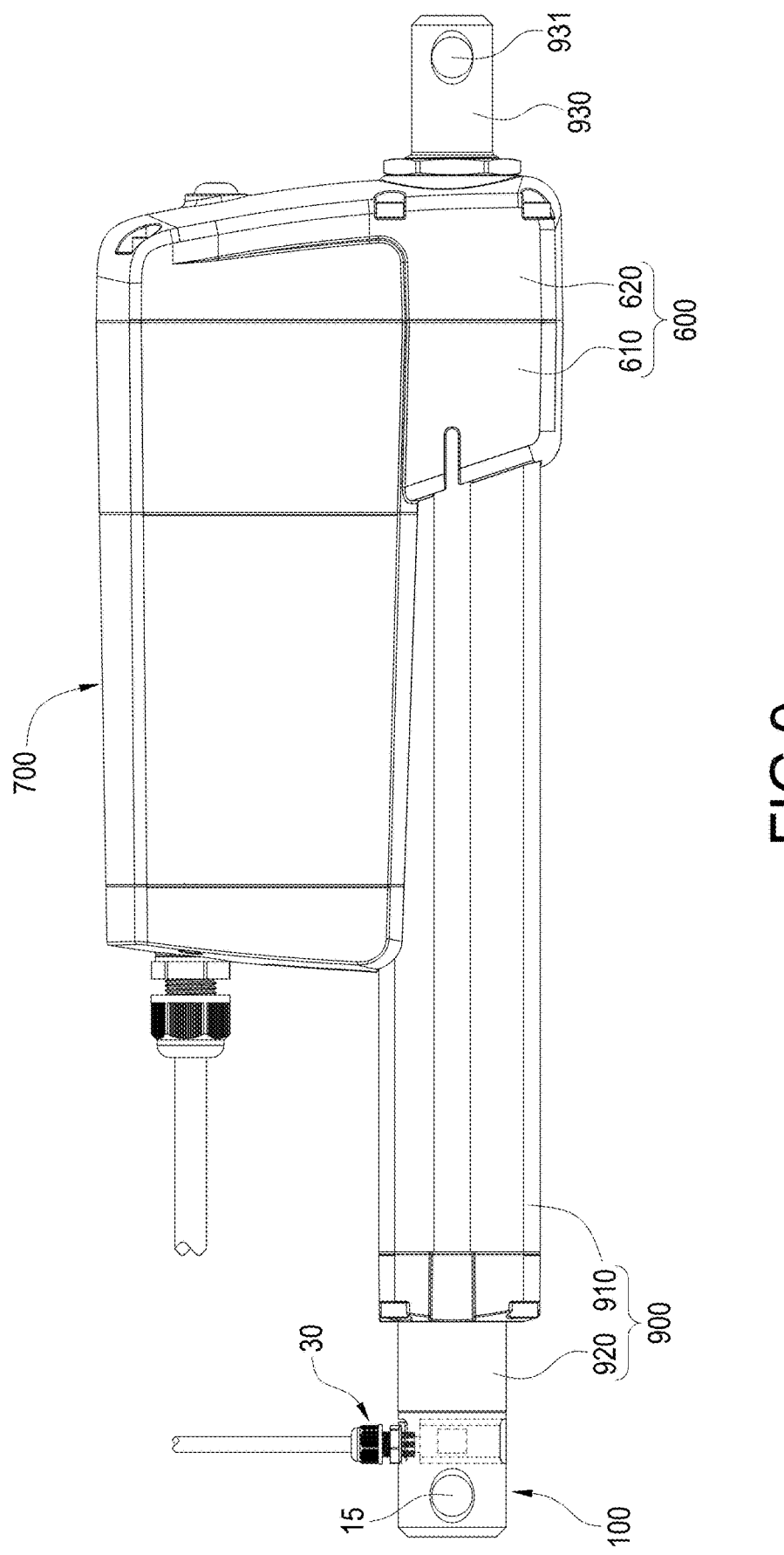
FIG. 9 is a top view of the electric actuator in second embodiment of the present disclosure.

It is noting that the strain sensing device 100 of the electric actuator of the present disclosure is not limit to the configuration of installing on the gear box 600. Please refer FIG. 9, which is the second embodiment of the electric actuator of the present disclosure. The main difference between the second embodiment and the first embodiment mentioned above is that in the second embodiment the positions of the strain sensing device 100 and the supporting seat 930 are exchanged in comparison with that in the first embodiment. In detail, the strain sensing device 100 in the embodiment is screwed on the end of the inner tube 920 through the thread portion 18 of the outer edge of the load body 10, and the supporting seat 930 is mounted on cover shell 620 of the gear box 600 to detect a strain change of the end of the inner tube 920 through the strain sensing device 100. That is the user can change the position of the strain sensing device 100 according to different needs, the user can also choose to not dispose the strain sensing device 100 at either end of the inner tube 920 when not needs to detect strain changes.

In the strain sensing device 100 of the present disclosure, the strain gauges 20 and the circuit boards 40 are easily assembled through the opening 12 communicated to the chamber 11. Through the Wheatstone bridge formed by the strain gauges 20 and the circuit boards 40 is integrated with the mating connector, and the mounting cover 13 is arranged on the side opposite to the opening 12 of the chamber 11 for cable connector 30 installing, the strain sensing device 100 of the present disclosure can lead signal wires to outside through the cable connector 30 for use according to different needs and the strain sensing device 100 can be easily assembled or disassembled. The strain sensing device 100 is therefore can use alone as the load cell or use in conjunction with an actuator such as electric actuator. That is each of the strain gauges 20 can detect the changes in resistance value caused by the slight deformation of each of the detection surfaces 111 when the load body 10 is affected by the external force, the changes in resistance value is converted into the deformation of each of the detection surfaces 111 through the Wheatstone bridge, and then the value of the deformation is transmitted to the external through the cable connector 30 for the user to read or for the controller to receive.

The electric actuator of the present disclosure installs the strain sensing device 100 corresponding to the leadscrew 800 on the gear box 600 or the end of the inner tube 920, so that when the motor 700 drives the leadscrew 800 to rotate by the transmission mechanism 630 to drive the inner tube 920 to extend from the outer tube 910, the strain gauges 20 can detect the changes in resistance value caused by the slight deformation of each of the detection surfaces 111, the changes in resistance value is converted into the deformation of each of the detection surfaces 111 through the Wheatstone bridge to measure the loading weight of the electric actuator, and the user can quickly change the position of the strain sensing device 100 according to different needs.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A strain sensing device, comprising:
   a load body, defining a chamber and an opening and comprising a mounting cover, the chamber communicated to outside of the load body through the opening, a pair of detection surfaces arranged on opposite sides of the chamber, the opening and the mounting cover located on opposite sides of the chamber;

a pair of strain gauges, respectively arranged on each of the detection surfaces; and a cable connector, comprising a connector head arranged on the mounting cover and a cable threading the connector head and electrically connected to the strain gauges;

wherein when the load body is affected by an external force, each of the strain gauges is configured to detect a deformation of each of the detection surfaces.

2. The strain sensing device according to claim 1, wherein the load body defines a notch, the notch is formed on part of a periphery of the mounting cover and located on same side of the chamber with the mounting cover.

3. The strain sensing device according to claim 2, wherein the notch is arc-shaped or inverted U-shaped.

4. The strain sensing device according to claim 1, further comprising a sealing member, the sealing member seals the opening and wraps the strain gauges.

5. The strain sensing device according to claim 1, further comprising a circuit board, the circuit board is arranged in the chamber and located between the strain gauges, the circuit board is electrically connected to the strain gauges and the cable.

6. An electric actuator, comprising:

a gear box;

a motor, connected to the gear box;

a leadscrew, part of the leadscrew accommodated in the gear box and driven by the motor, the other part of the leadscrew extended outside of the gear box;

a telescopic tube, threadedly connected to the leadscrew for transmission; and the strain sensing device according to one of claim 1, configured to be detachably connected to the gear box such that an end of the leadscrew is accommodated in the load body;

Wherein when the telescopic tube is driven to apply a thrust force such that an acting force of the thrust force transmits to impact the load body, each of the strain gauges is configured to detect a deformation of each of the detection surfaces.

7. The electric actuator according to claim 6, wherein the load body defines a pit and comprises a stopping ring, the pit is recessed from an end surface of the load body, the stopping ring extends outward from an outer edge of the load body.

8. The electric actuator according to claim 7, wherein the gear box comprises a cover shell, the cover shell comprises a step and defines a through hole, the step is formed on a periphery of the through hole, the load body penetrates the through hole, the stopping ring abuts against the step, the end of the leadscrew accommodated in the pit.

9. The electric actuator according to claim 8, further comprising an end cap, the end cap is sleeved and fixed on the leadscrew, the stopping ring is clamped and fixed between the end cap and the step.

10. The electric actuator according to claim 9, wherein the end cap comprises a positioning block, the load body comprises an embedded groove, the positioning block is embedded in the embedded groove.

11. The electric actuator according to claim 6, wherein the load body defines a notch, the notch is formed on part of a periphery of the mounting cover and located on same side of the chamber with the mounting cover.

12. The electric actuator according to claim 11, wherein the notch is arc-shaped or inverted U-shaped.

13. The electric actuator according to claim 6, further comprising a sealing member, the sealing member seals the opening and wraps the strain gauges.

14. The electric actuator according to claim 6, further comprising a circuit board, the circuit board is arranged in the chamber and located between the strain gauges, the circuit board is electrically connected to the strain gauges and the cable.

* * * * *